(12) United States Patent
Cai et al.

(10) Patent No.: US 12,015,178 B2
(45) Date of Patent: Jun. 18, 2024

(54) BATTERY CELL, BATTERY PACK, AND METHOD OF MAKING THE SAME INCORPORATING FEATURES THAT ACCELERATE HEAT DISSIPATION, IMPROVE UNIFORMITY OF HEAT DISTRIBUTION, AND REDUCE SIZE

(71) Applicant: GM GLOBAL TECHNOLOGY OPERATIONS LLC, Detroit, MI (US)

(72) Inventors: Yun Cai, Dexter, MI (US); Xingcheng Xiao, Troy, MI (US); Bin Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 17/459,224

(22) Filed: Aug. 27, 2021

(65) Prior Publication Data

US 2023/0061023 A1 Mar. 2, 2023

(51) Int. Cl.
*H01M 50/581* (2021.01)
*H01M 50/249* (2021.01)

(52) U.S. Cl.
CPC ....... *H01M 50/581* (2021.01); *H01M 50/249* (2021.01)

(58) Field of Classification Search
None
See application file for complete search history.

(56) References Cited

U.S. PATENT DOCUMENTS

| | | |
|---|---|---|
| 8,974,946 B2 | 3/2015 | Cai et al. |
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |

(Continued)

FOREIGN PATENT DOCUMENTS

| | | | | |
|---|---|---|---|---|
| KR | 20190074796 A | * | 6/2019 | .......... H01M 10/613 |
| WO | WO-2014182281 A1 | | 11/2014 | |
| WO | WO-2017045573 A1 | | 3/2017 | |

OTHER PUBLICATIONS

Machine translation of KR20190074796A (Year: 2019).*

(Continued)

*Primary Examiner* — Brian R Ohara
*Assistant Examiner* — Michelle T Leonard

(57) ABSTRACT

A battery cell includes an inner plastic layer, an outer plastic layer, and a middle metal layer. The inner and outer plastic layers extends along at least three of sides of the battery cell. The middle metal layer is disposed between the inner and outer plastic layers. The middle metal layer extends along the at least three sides of the battery cell and projects from at least a fourth side of the battery cell to form at least one heat dissipation tab. The at least one heat dissipation tab is configured to transfer heat to at least one cooling plate through thermal conduction. The fourth side of the battery cell connects two of the at least three sides to one another.

19 Claims, 7 Drawing Sheets

(56) References Cited

U.S. PATENT DOCUMENTS

| | | |
|---|---|---|
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 10,991,946 B2 | 4/2021 | Xiao et al. |
| 11,101,501 B2 | 8/2021 | Liu et al. |
| 2011/0008665 A1* | 1/2011 | Yoon ............... H01M 10/6562 429/120 |
| 2014/0265557 A1 | 9/2014 | Huang et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0104690 A1 | 4/2015 | Xiao et al. |
| 2015/0162583 A1 | 6/2015 | Dadheech et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2018/0175468 A1* | 6/2018 | Shin ............... H01M 10/6556 |
| 2019/0348644 A1* | 11/2019 | Minamitani ........ H01M 50/51 |
| 2019/0372155 A1 | 12/2019 | Yersak et al. |
| 2019/0393549 A1 | 12/2019 | Yersak et al. |
| 2020/0127282 A1 | 4/2020 | Yersak et al. |
| 2020/0365855 A1* | 11/2020 | Murayama ........ H01M 10/6557 |
| 2020/0395630 A1 | 12/2020 | Yersak et al. |
| 2021/0135230 A1 | 5/2021 | Xu et al. |

OTHER PUBLICATIONS

U.S. Appl. No. 17/128,974, filed Dec. 21, 2020, Xiao et al.
U.S. Appl. No. 15/755,839, filed Feb. 27, 2018, Li et al.
U.S. Appl. No. 15/473,052, filed Mar. 29, 2017, Dai et al.

* cited by examiner

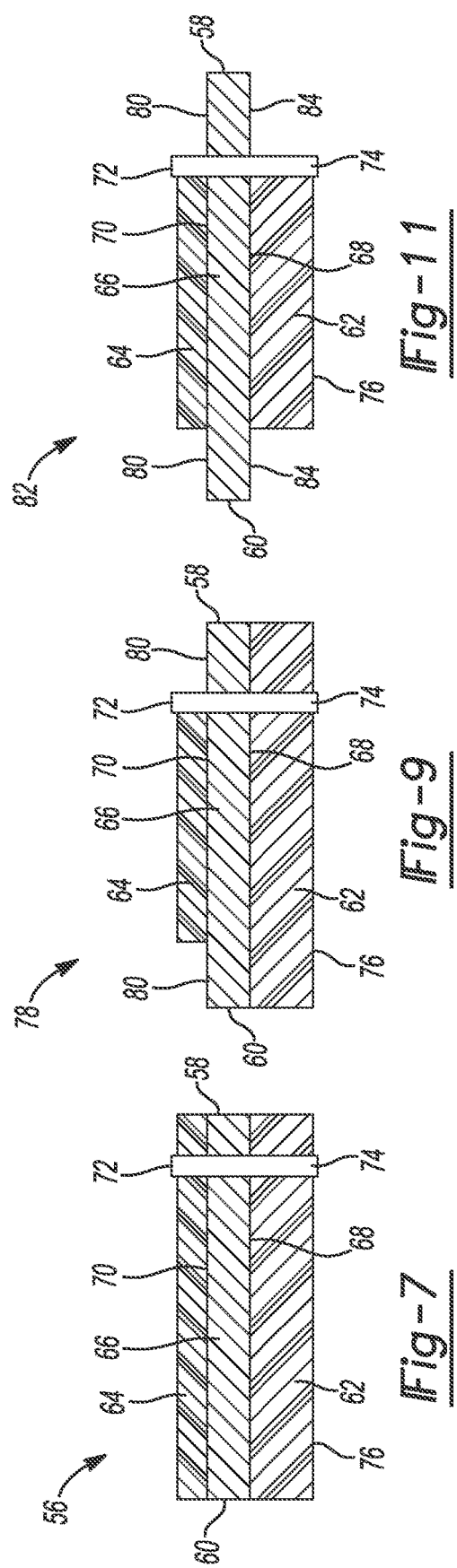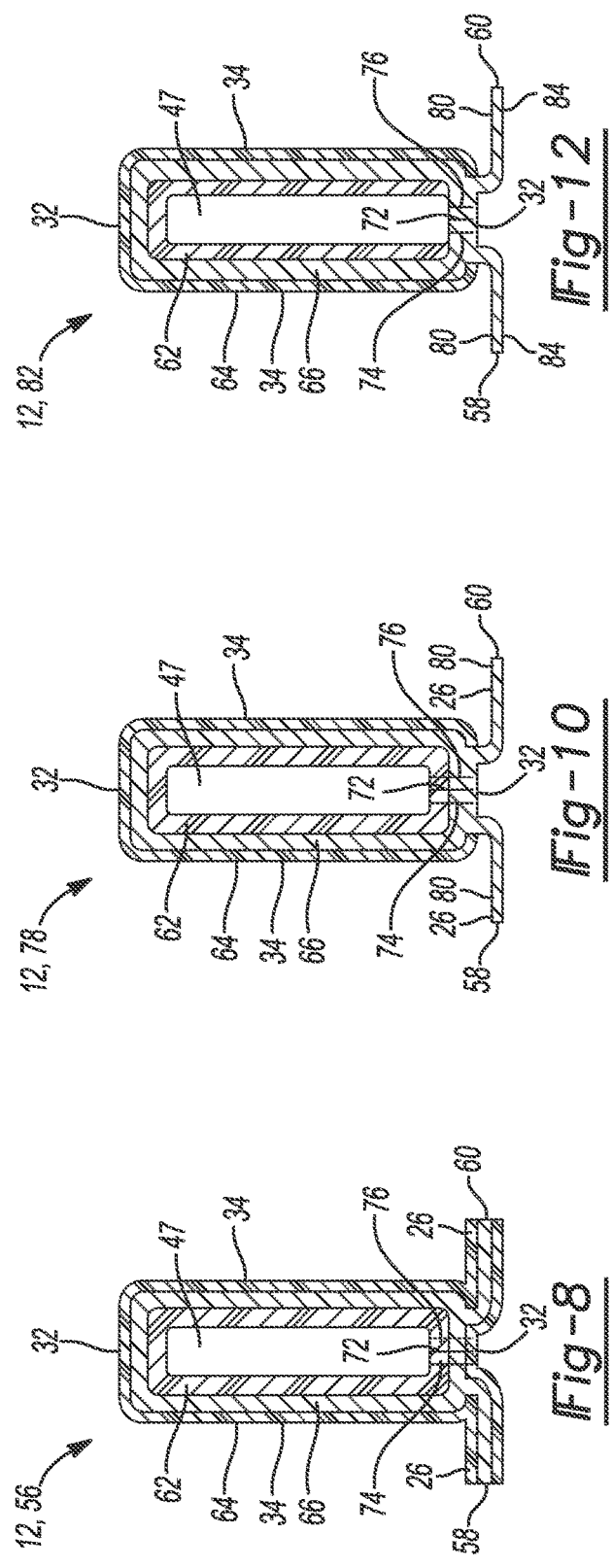

BATTERY CELL, BATTERY PACK, AND METHOD OF MAKING THE SAME INCORPORATING FEATURES THAT ACCELERATE HEAT DISSIPATION, IMPROVE UNIFORMITY OF HEAT DISTRIBUTION, AND REDUCE SIZE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, battery packs, and methods of making the same incorporating features that accelerate heat dissipation, improve uniformity of heat distribution, and reduce size.

A battery pack for an electrical vehicle typically includes a cell pack and one or more cooling plates disposed adjacent to the cell pack. The cell pack typically includes multiple sets of battery cells and a thermal resistant barrier disposed between the cell sets. The thermal resistant barrier inhibits heat transfer between the cell sets. The cooling plate(s) absorb(s) heat from the battery cells to maintain the battery pack within a target temperature range. In some cases, each cooling plate is a metal plate that defines one or more channels through which coolant flows.

SUMMARY

A battery cell according to the present disclosure includes an inner plastic layer, an outer plastic layer, and a middle metal layer. The inner and outer plastic layers extends along at least three of sides of the battery cell. The middle metal layer is disposed between the inner and outer plastic layers. The middle metal layer extends along the at least three sides of the battery cell and projects from at least a fourth side of the battery cell to form at least one heat dissipation tab. The at least one heat dissipation tab is configured to transfer heat to at least one cooling plate through thermal conduction. The fourth side of the battery cell connects two of the at least three sides to one another.

In one aspect, the inner plastic layer extends along the at least three sides of the battery cell and the fourth side of the battery cell.

In one aspect, the inner plastic layer extends along the at least three sides of the battery cell and does not extend along the fourth side of the battery cell.

In one aspect, the outer plastic layer extends along the at least three sides of the battery cell and at least partially along the fourth side of the battery cell.

In one aspect, the outer plastic layer also projects from the fourth side of the battery cell and encases a portion of the middle metal layer that forms the at least one heat dissipation tab.

In one aspect, the outer plastic layer extends along the at least three sides of the battery cell and does not extend along the fourth side of the battery cell.

In one aspect, the inner and outer plastic layer extend along the at least three sides of the battery cell and do not extend along the fourth side of the battery cell, and the middle metal layer extends along at least three sides of the battery cell and the fourth side of the battery cell.

In one aspect, the middle metal layer projects from the fourth side of the battery cell and one of the at least three sides of the battery cell to form a pair of heat dissipation tabs configured to transfer heat to a pair of cooling plates through thermal conduction.

In one aspect, the inner plastic layer is a polypropylene layer, the outer plastic layer is a layer made of nylon, polyethylene terephthalate (PET), or a combination of nylon and PET, and the middle metal layer is a layer made of aluminum, nickel, titanium, or stainless steel.

A method of making a battery cell according to the present disclosure includes forming a metal layer, forming a first plastic layer on one side of the metal layer, and forming a second plastic layer on the other side of the metal layer. The metal layer and the first and second plastic layers forming a tri-layer structure. At least one of the first and second plastic layers is formed in discontinuous segments along a length of the metal layer such that portions of the metal layer are exposed. The method further includes cutting the tri-layer structure such that the exposed portions of the metal layer form opposite ends of the tri-layer structure, and heating a portion of at least one of the first and second plastic layers to form a seal that seals an interior of the battery cell.

In one aspect, the method further includes folding the tri-layer structure so that the first plastic layer forms an inner layer of the battery cell and the ends of the tri-layer structure are adjacent to one another, and heating portions of the first plastic layer adjacent to the ends to form the seal.

In one aspect, the second plastic layer is formed in the discontinuous segments along the length of the metal layer.

In one aspect, both of the first and second plastic layers are formed in the discontinuous segments along the length of the metal layer.

In one aspect, the exposed portions of the metal layer do not extend across an entire width of the metal layer.

In one aspect, the first plastic layer is a polypropylene layer, the second plastic layer is a layer made of nylon, polyethylene terephthalate (PET), or a combination of nylon and PET, and the metal layer is a layer made of aluminum, nickel, titanium, or stainless steel.

A battery pack according to the present disclosure includes a first set of battery cells, a second set of battery cells, and a thermal resistant barrier disposed between the first and second sets of battery cells. The thermal resistant barrier including a polyurethane layer having a first surface and a second surface opposite of the first surface. The first surface of the polyurethane layer directly faces the first set of battery cells, and the second surface of the polyurethane layer directly faces the second set of battery cells.

In one aspect, the thermal resistant barrier is free of any aluminum layer.

In one aspect, the thermal resistant barrier is free of any gel layer.

In one aspect, the battery pack further includes a cooling plate. An end of each battery cell of the first and second sets of battery cells is in contact with the cooling plate. The thermal resistant barrier is spaced apart from the cooling plate.

In one aspect, each battery cell of the first and second sets of battery cells includes an inner plastic layer extending along at least three sides of the battery cell, an outer plastic layer extending along the at least three sides of the battery cell, and a middle metal layer disposed between the inner and outer plastic layers. The middle metal layer extends along the at least three sides of the battery cell and projects from at least a fourth side of the battery cell to form at least one heat dissipation tab configured to transfer heat to at least one cooling plate through thermal conduction. The fourth side of the battery cell connects two of the at least three sides to one another.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a section view of an example of a tri-layer structure used to form a first embodiment of the casings of the battery cells of FIG. 1;

FIG. 8 is a section view of the first embodiment of the casings of the battery cells of FIG. 1;

FIG. 9 is a section view of an example of a tri-layer structure used to form a second embodiment of the casings of the battery cells of FIG. 1;

FIG. 10 is a section view of the second embodiment of the battery cells of FIG. 1;

FIG. 11 is a section view of an example of a tri-layer structure used to form a third embodiment of the battery cells of FIG. 1;

FIG. 12 is a section view of the third embodiment of the battery cells of FIG. 1;

In the drawings, reference numbers may be reused to identify similar and/or identical elements.

DETAILED DESCRIPTION

A battery pack typically includes multiple sets of battery cells, a thermal resistant barrier disposed between the cell sets, and one or more cooling plates. Each battery cell includes a main body having a first end, a second end, and four perimeter surfaces or sides extending from the first end to the second end. Each battery cell further includes a pair of terminals attached to the first and second ends thereof. In some cases, each battery cell includes an outer nylon layer, an inner polypropylene layer, and a middle aluminum layer. Each of the outer nylon layer, the inner polypropylene layer, and the middle aluminum layer extends around all four sides of the battery cell and fully encloses the interior thereof.

Each battery cell is assembled in the battery pack such that one of its sides is adjacent to and/or contacting the cooling plate. In some cases, a thermal paste may be applied between the sides of the battery packs and the cooling plate. In any case, heat flowing from the interior of each battery cell to the cooling plate must pass through all of the layers of the respective battery cell (i.e., the inner polypropylene layer, the outer nylon layer, and the middle aluminum layer). Thus, the rate of heat dissipation from the battery cells to the cooling plate may not be as high as desired, and therefore the size and cost of the cooling system may be increased to satisfy the cooling demands of the battery pack.

A battery cell according to the present disclosure includes one or more heat dissipation tabs that address these issues by increasing the rate of heat dissipation from the interior of the battery cell to the cooling plate. In one example, a middle aluminum layer of the battery cell protrudes from one side of the battery cell to form the heat dissipation tabs, while the inner polypropylene layer and the outer nylon layer do not extend along that side of the battery cell. In turn, heat flowing from the interior of each battery cell to the cooling plate need only pass through the outer nylon layer. In addition, the heat distribution tabs are disposed in closer proximity to the cooling plate than the remainder of the middle aluminum layer. Thus, the rate of heat dissipation from the battery cell to the cooling plate may be higher than typical, and therefore the size and cost of the cooling system may be decreased to satisfy the cooling demands of the battery pack.

Furthermore, the uniformity of heat distribution within the battery cells is improved, and therefore the degradation of the battery cells is reduced and the cycle life of the battery cells is improved. Moreover, heat buildup within one of the battery cells (e.g., hot spot formation) is less of a concern. Therefore, one or more layers of the thermal resistant barrier may be eliminated, or the thermal resistant barrier may be eliminated altogether. In turn, the overall size of the battery pack may be reduced.

Figure 1:
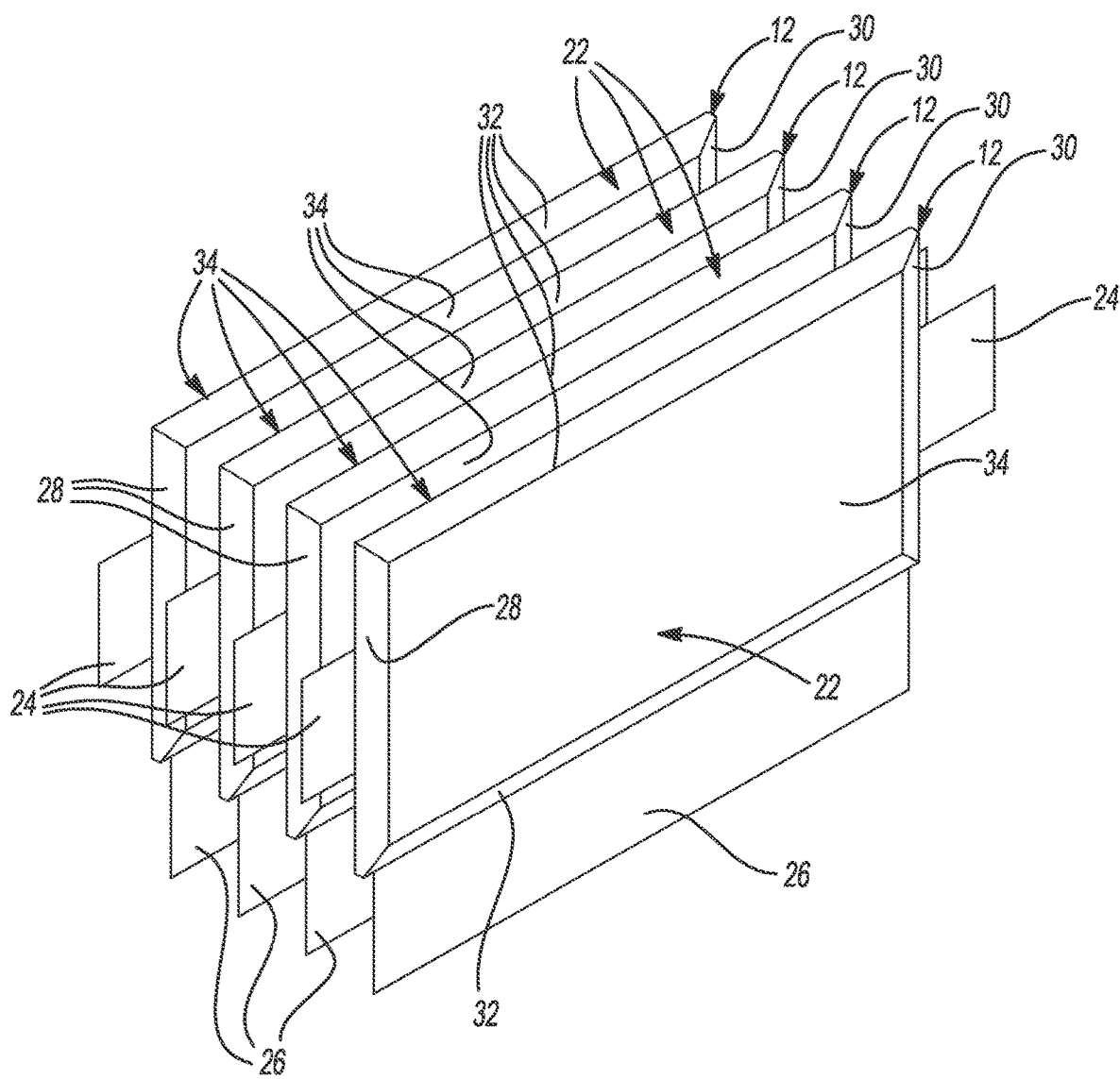
FIG. 1 is a perspective view of an example of battery cells according to the present disclosure.
Figure 2:
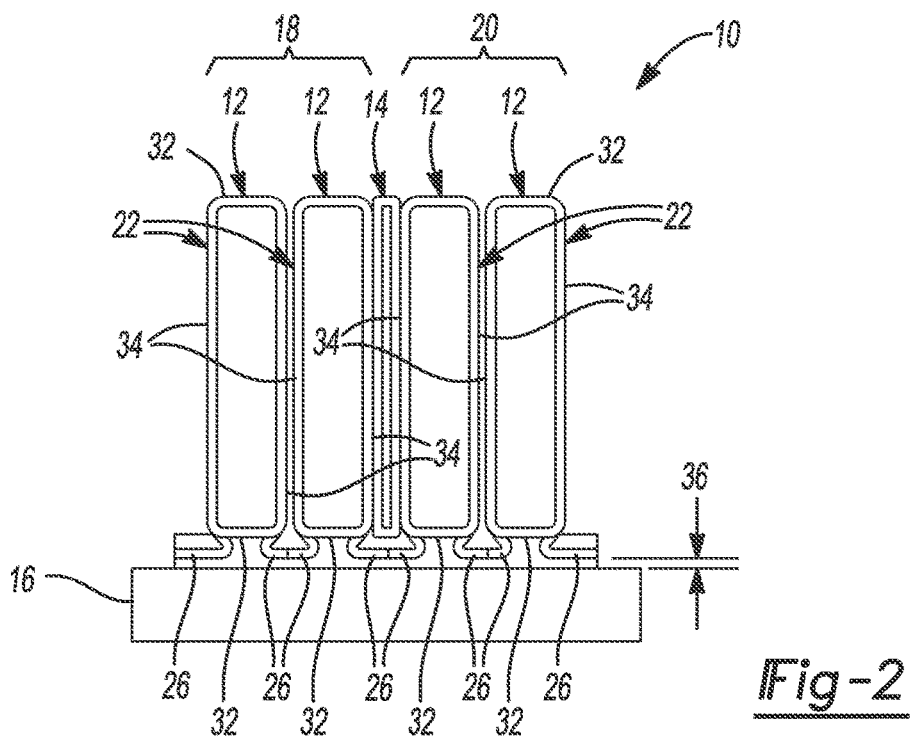
FIG. 2 is a section view of an example of a battery pack according to the present disclosure, the battery pack including the battery cells of FIG. 1 and a thermal resistant barrier.

Referring now to FIGS. 1 and 2, a battery pack 10 includes battery cells 12, a thermal resistant barrier 14, and a cooling plate 16. The thermal resistant barrier 14 is disposed between a first set 18 of the battery cells 12 and a second set 20 of the battery cells 12. Each of the first and second sets 18 and 20 includes a pair of the battery cells 12. The battery cells 12 store energy that may be used to power one or more electric motors of an electric vehicle (not shown). The thermal resistant barrier 14 inhibits heat transfer between the first and second sets 18 and 20 of the battery cells 12. The cooling plate 16 absorbs heat from the battery cells 12.

Each battery cell 12 includes a main body 22, a pair of terminals 24, and a pair of heat dissipation tabs 26. The main body 22 of each battery cell 12 has a first end 28, a second end 30 opposite of the first end 28, and first and second sides or side surfaces 32 and 34 that extend between the first and second ends 28 and 30. The first side surfaces 32 of each battery cell 12 are opposite of one another, and the second side surfaces 34 of each battery cell 12 are opposite of one another. Each first side surface 32 connect the second side surfaces 34 to one another, and each second side surface 34 connects the first side surfaces 32 to one another.

Each terminal 24 projects from one of the first and second ends 28 and 30. The terminals 24 are made from metal (e.g., copper, aluminum). In one example, when the battery cells 12 are assembled in the battery pack 10, all of the terminals 24 projecting from the first ends 28 of the battery cells 12 are made of copper, and all of the terminals 24 projecting from the second ends 30 of the battery cells 12 are made of aluminum.

Each heat dissipation tab 26 projects from one of the first side surfaces 32 of the main body 22. The heat dissipation tabs 26 are primarily or entirely made of metal (e.g., aluminum). When the battery pack 10 is assembled, the heat dissipation tabs 26 may directly contact the cooling plate 16 to increase the rate of heat dissipation from the battery cells 12 to the cooling plate 16. Alternatively, the heat dissipation tabs 26 may be spaced apart from the cooling plate 16 by a gap 36, a thermal paste 98 (FIG. 18) may be applied in the gap 36 between the heat dissipation tabs 26 and the cooling plate 16 to further increase the rate of heat dissipation from the battery cells 12 to the cooling plate 16. In either case, the heat dissipation tabs 26 transfer heat to the cooling plate 16 through thermal conduction.

Figure 3:
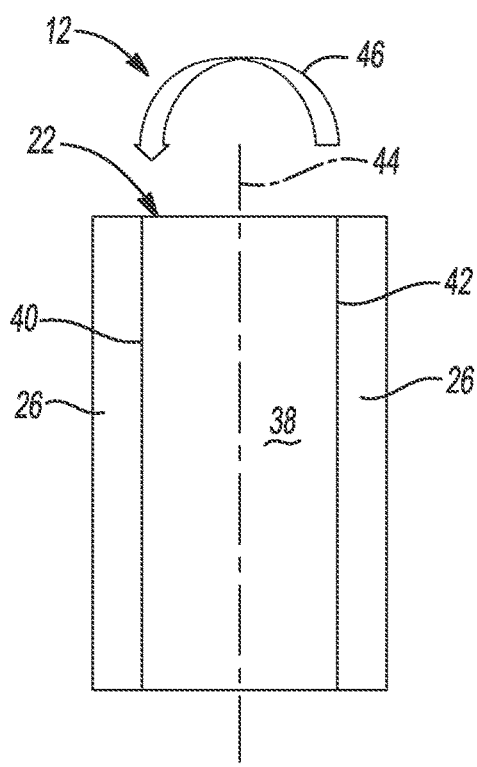
FIG. 3 is a planar view of one of the battery cells of FIG. 1 before the battery cell is folded and sealed.
Figure 4:
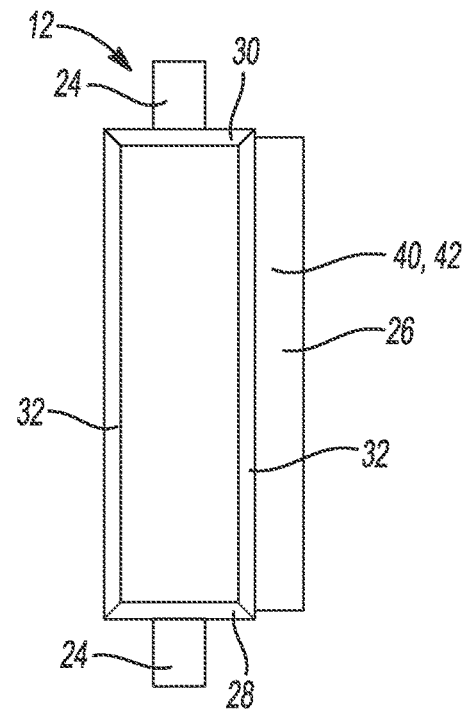
FIG. 4 is a planar view of the battery cell of FIG. 3 after the battery cell is folded and sealed.

Referring now to FIG. 3, one of the battery cells 12 is shown before the battery cell 12 is folded and sealed and before the terminals 24 are attached to the main body 22 of the battery cell 12. When the battery cell 12 is in its unfolded state as shown in FIG. 3, an interior surface 38 of the battery cell 12 is exposed. In addition, one of the heat dissipation tabs 26 extends from a first edge 40 of the main body 22, and the other heat dissipation tab 26 extends from a second edge 42 of the main body 22. To form the battery cell 12, the main body 22 of the battery cell 12 is folded about a longitudinal axis 44 of the battery cell 12, as indicated by an arrow 46, until the heat dissipation tabs 26 overlap one another as shown in FIG. 4.

The first and second edges 40 and 42 of the main body 22 are then joined together to seal an interior 47 (FIGS. 8, 10, 12, 18) of the battery cell 12. The battery cell 12 may also be sealed along the first and second ends 28 and 30 of the main body 22 such that the interior 47 of the battery cell 12 is completely sealed. The terminals 24 may be attached to the main body 22 at or near the first and second ends 28 and 30 of before or when the first and second ends 28 and 30 are sealed. Once the battery cell 12 is sealed, portions of the heat dissipation tabs 26 may be bent in a direction perpendicular to the second side surfaces 34 of the main body 22 as shown in FIG. 2 such that the portions are parallel to the cooling plate 16.

Figure 5:
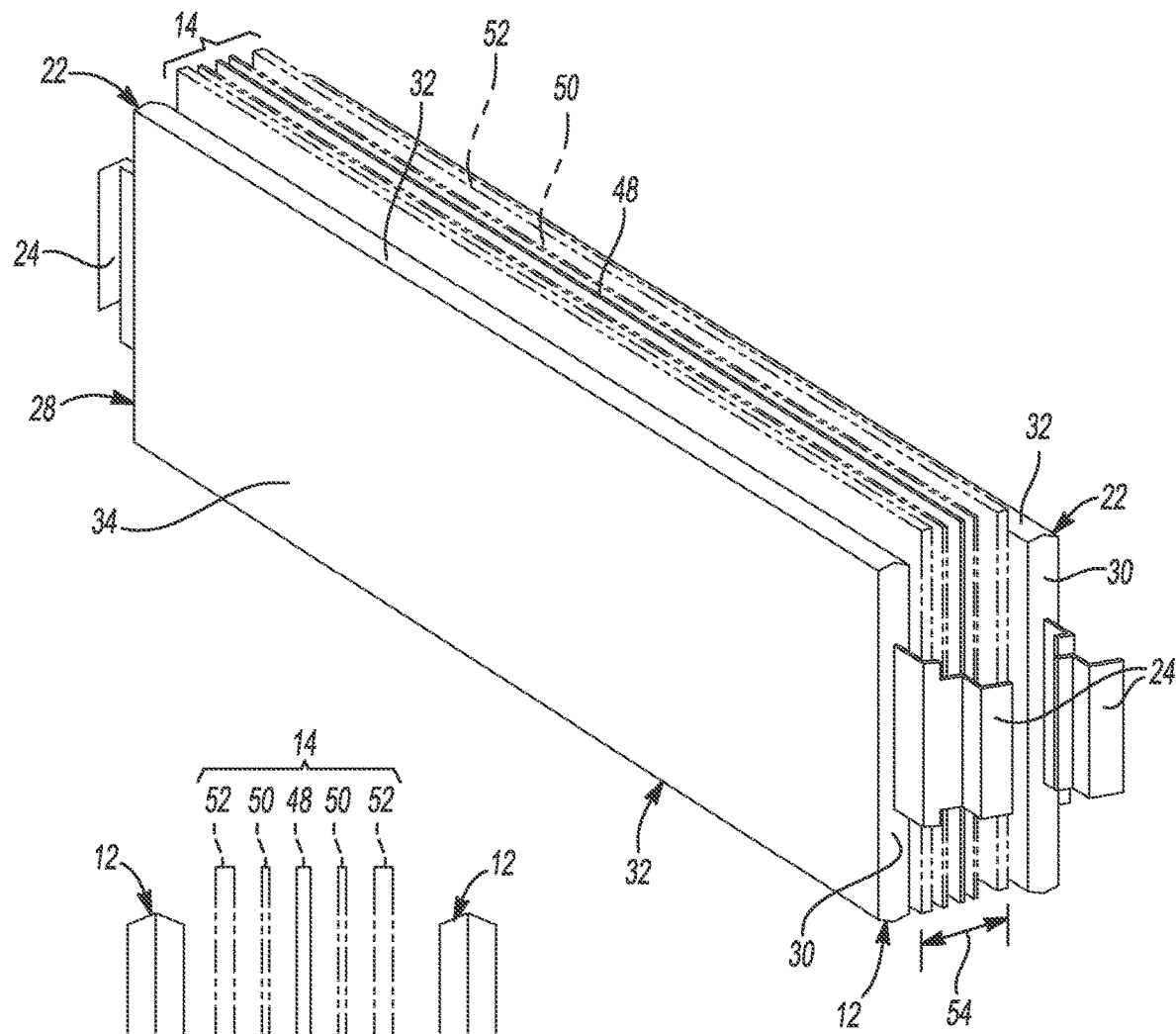
FIG. 5 is a perspective view of the battery cells and the thermal resistant barrier of FIG. 2.
Figure 6:
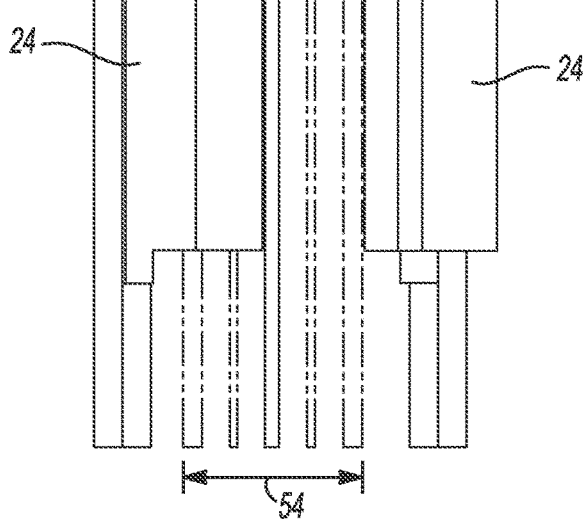
FIG. 6 is an end view of the battery cells and the thermal resistant barrier of FIG. 2.

Referring now to FIGS. 5 and 6, the thermal resistant barrier 14 is shown between two of the battery cells 12, which may include the heat dissipation tabs 26. The thermal resistant barrier 14 includes a polyurethane layer 48. Metal (e.g., aluminum) layers 50 and gel layers 52 are shown in phantom to indicate that the thermal resistant barrier 14 does not include the metal layers 50 or the gel layers 52. The gel layers 52 include a microporous solid in which the dispersed phase is a gas. Examples of the gel layers 52 include microporous silica, microporous glass, and zeolites.

The increased rate of heat dissipation provided by the heat dissipation tabs 26 reduces the need to insulate the first and second sets 18 and 20 of the battery cells 12 from one another, and thereby enables omitting the metal layers 50 and the gel layers 52. Since the thermal resistant barrier 14 does not include the metal layers 50 or the gel layers 52, a thickness 54 of the thermal resistant barrier 14 may be (e.g., 60 to 70 percent) less than thermal resistant barriers that include the metal layers 50 and/or the gel layers 52. In turn, the overall size of the battery pack 10 may be reduced. In various implementations, the thermal resistant barrier 14 may be omitted altogether, which may further reduce the size of the battery pack 10.

Referring now to FIG. 7, an example of a tri-layer structure 56 that may be used to form each battery cells 12 is shown. The tri-layer structure 56 has a first end 58 and a second end 60 opposite of the first end 60. The tri-layer structure 56 includes an inner plastic layer 62, an outer plastic layer 64, and a middle metal layer 66. The inner plastic layer 62 may be a polypropylene layer, the outer plastic layer 64 may be a layer made of nylon, polyethylene terephthalate (PET), or a combination of nylon and PET, and the middle metal layer 66 may be a layer made of aluminum, nickel, titanium, or stainless steel. The inner and outer plastic layers 62 and 64 may be formed (e.g., sprayed, coated, cast) on first and second surfaces 68 and 70, respectively, of the middle metal layer 66.

With additional reference to FIG. 8, the tri-layer structure 56 further includes a seal 72 that seals the interior 47 of the battery cell 12. The seal 72 may be created by melting a portion of the inner plastic layer 62 using, for example, a hot press. Although FIG. 8 only shows the seal 72 disposed at a first location 74 adjacent to the first end 58 of the tri-layer structure 56, the seal 72 may also be disposed at a second location 76 adjacent to the second end 60 of the tri-layer structure 56. The first and second locations 74 and 76 are locations along the length of the tri-layer structure 56.

To form the battery cell 12, the tri-layer structure 56 may be folded so that the first and second locations 74 and 76 are adjacent to one another as shown in FIG. 8. The seal 72 may then be created to join the first and second locations 74 and 76 to one another and thereby seal the interior 47 of the battery cell 12. The heat dissipation tabs 26 are formed by portions of the tri-layer structure 56 that project beyond the seal 72 (i.e., portions disposed between the first end 58 and the first location 74 and between the second end 60 and the second location 76). In contrast, if the first and second end 58 and 60 of the tri-layer structure 56 were joined together to form the seal 72, the battery cell 12 would not include the heat dissipation tabs 26.

When the battery cell 12 is formed from the tri-layer structure 56 as shown in FIG. 8, the inner plastic layer 62 extends along both of the first side surfaces 32 and both of the second side surfaces 34. In addition, the outer plastic layer 64 and the middle metal layer 66 extend along one of the first side surfaces 32 and both of the second side surfaces 34 and at least partially along the other side surface 32. Furthermore, portions of the middle metal layer 66 project from the other side surface 32 to form the heat dissipation tabs 26, and portions of the outer plastic layer 64 project from the other side surface 32 and encase the projecting portions of the middle metal layer 66. The portions of the inner plastic layer 62 that project beyond the seal 72 are melted to form the seal 72 and/or are removed.

Referring now to FIGS. 9 and 10, another example of a tri-layer structure 78 that may be used to form each battery cells 12 is shown. The tri-layer structures 78 is similar to the tri-layer structure 56. However, in the tri-layer structure 56, both the inner and outer plastic layers 52 and 64 extend along the entire length of the tri-layer structure 78 from the first end 58 thereof to the second end 60 thereof. In contrast, in the tri-layer structure 78, only the inner plastic layer 62 extends along the entire length of the tri-layer structure 78, while the outer plastic layer 64 extends between, but not beyond, the first and second locations 74 and 76. As a result, portions 80 of the second surface 70 of the middle metal layer 66 are exposed.

The tri-layer structure 78 may be folded and sealed to form each battery cell 12 in the same manner that the tri-layer structure 56 is folded and sealed to form each battery cell 12. When the battery cell 12 is formed from the tri-layer structure 78 as shown in FIG. 10, the inner plastic layer 62 extend along both of the first side surfaces 32 and both of the second side surfaces 34. In addition, the outer plastic layer 64 and the middle metal layer 66 extend along one of the first side surfaces 32 and both of the second side surfaces 34, and the middle metal layer 66 extends at least partially along the other side surface 32. The outer plastic layer 64 does not extend along the other side surface 32.

Furthermore, portions of the middle metal layer 66 project from the other side surface 32 to form the heat dissipation tabs 26. Since the outer plastic layer 64 does not extend beyond the first and second locations 74 and 76, the outer plastic layer 64 does not include portions that project from the other side surface 32 and encase the projecting portions of the middle metal layer 66. As a result, the projecting portions of the middle metal layer 66 are exposed, which may further increase the rate of heat dissipation from the battery cell 12 to the cooling plate 16.

Referring now to FIGS. 11 and 12, another example of a tri-layer structure 82 that may be used to form each battery cells 12 is shown. The tri-layer structure 82 is similar to the tri-layer structure 78. However, in the tri-layer structure 82, both the inner and outer plastic layers 52 and 64 extend between, but not beyond, the first and second locations 74 and 76. As a result, portions 80 of the second surface 70 of the middle metal layer 66 are exposed, and portions 84 of the first surface 68 are exposed.

The tri-layer structure 82 may be folded and sealed to form each battery cell 12 in the same manner that the tri-layer structure 56 is folded and sealed to form each battery cell 12. When the battery cell 12 is formed from the tri-layer structure 82 as shown in FIG. 12, the inner and outer plastic layers 62 and 64 and the middle metal layer 66 extend along one of the first side surfaces 32 and both of the second side surfaces 34. In addition, the middle metal layer 66 extends at least partially along the other side surface 32. The inner and outer plastic layers 62 and 64 do not extend along the other side surface 32.

Furthermore, portions of the middle metal layer 66 project from the other side surface 32 to form the heat dissipation tabs 26. Since the outer plastic layer 64 does not extend beyond the first and second locations 74 and 76, the projecting portions of the middle metal layer 66 are exposed. In addition, since the inner plastic layer 62 does not extend along the other side surface 32, heat within the interior 47 of the battery cell 12 may be transferred at a greater rate through portions of the middle metal layer 66 that extend along the other side surface 32. This may further increase the rate of heat dissipation from the battery cell 12 to the cooling plate 16.

Figure 13:
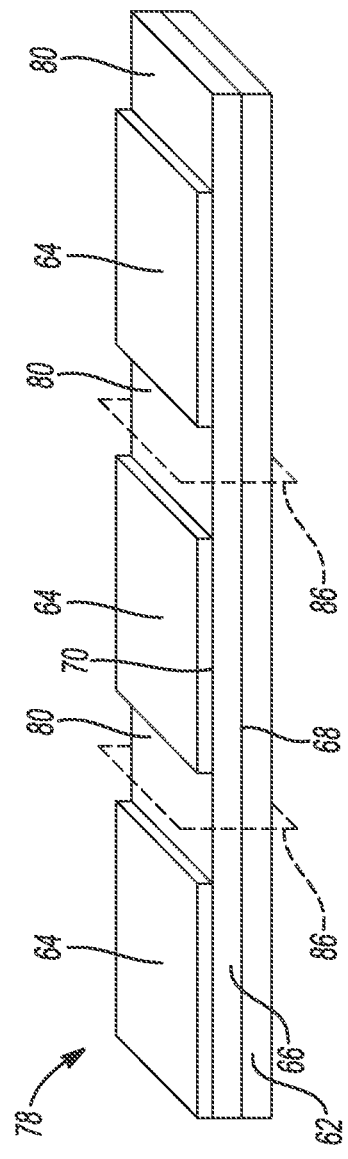
FIG. 13 is a perspective view of the tri-layer structure of FIG. 9.

Referring now to FIG. 13, a method of forming the tri-layer structure 78 will now be described. To form the tri-layer structure 56, each of the inner and outer plastic layers 62 and 64 is formed as a single continuous segment along the length of the middle metal layer 66. In contrast, to form the tri-layer structure 78, only the inner plastic layer 62 is formed as a single continuous segment along the length of the middle metal layer 66. The outer plastic layer 64 is formed as discontinuous segments along the length of the middle metal layer 66 such that the portions 80 of the second surface 70 are exposed. To form the portion of the tri-layer structure 78 shown in FIG. 9, the tri-layer structure 78 shown in FIG. 13 may be cut along planes 86 such that the exposed portions 80 of the middle metal layer 66 form the first and second ends 58 and 60 of the tri-layer structure 78.

Figure 14:
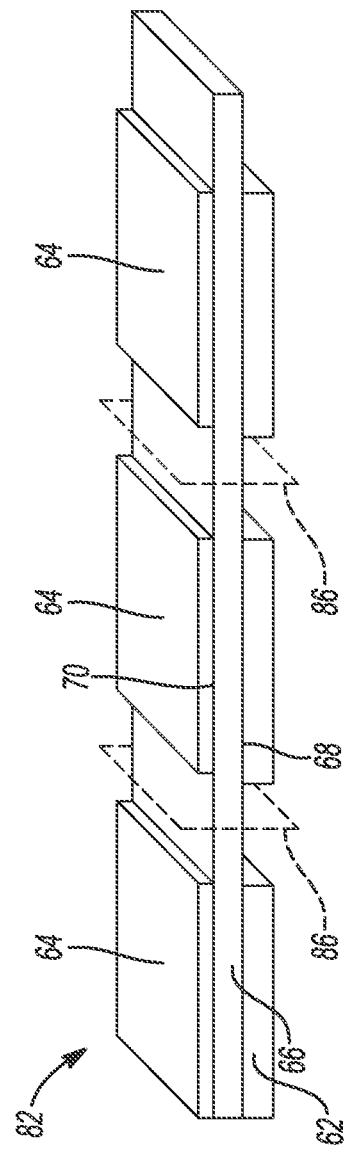
FIG. 14 is perspective view of a first embodiment of the tri-layer structure of FIG. 11.

Referring now to FIG. 14, a method of forming the tri-layer structure 82 will now be described. To form the tri-layer structure 56, the inner and outer plastic layers 62 and 64 are formed as discontinuous segments along the length of the middle metal layer 66 such that the portions 80, 84 of the first and second surfaces 68 and 70 are exposed. To form the portion of the tri-layer structure 82 shown in FIG. 11, the tri-layer structure 78 shown in FIG. 14 may be cut along the planes 86 such that the exposed portions 80, 84 of the middle metal layer 66 form the first and second ends 58 and 60 of the tri-layer structure 82.

Figure 15:
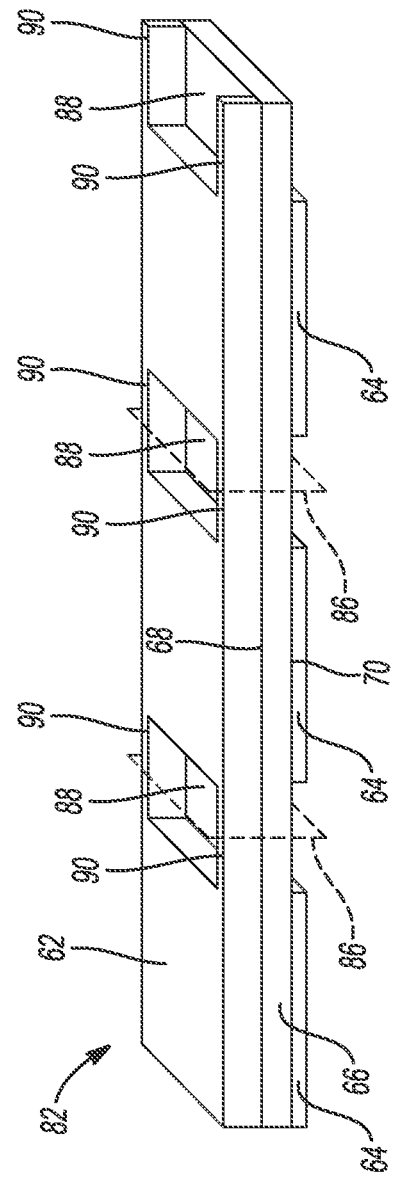
FIG. 15 is perspective view of a second embodiment of the tri-layer structure of FIG. 11.

Referring now to FIG. 15, another method of forming the tri-layer structure 82 will now be described. To form the tri-layer structure 82 according to this method, the inner plastic layer 62 is formed as both discontinuous and continuous segments along the length of the middle metal layer 66 such that only portions 88 of the first surface 68 are exposed. The exposed portions 88 do not extend across the entire width of the middle metal layer 66. In the example shown, the inner plastic layer 62 includes three discontinuous segments along the length of the tri-layer structure 82 and a pair of continuous segments along the length of the tri-layer structure 82. The continuous segments are disposed on opposite sides of the width of the tri-layer structure 82 and include connecting portions 90 that connect the discontinuous segments to one another. The connecting portions 90 of the inner plastic layer 62 are disposed on opposite sides of the exposed portions 88 of the middle metal layer 66.

In addition, to form the tri-layer structure 82 according to this method, the outer plastic layer 64 is formed as discontinuous segments along the length of the middle metal layer 66 such that the portions 80 of the second surface 70 are exposed. To form the portion of the tri-layer structure 82 shown in FIG. 11, the tri-layer structure 78 shown in FIG. 15 may be cut along the planes 86 such that the exposed portions 80, 88 of the middle metal layer 66 form the first and second ends 58 and 60 of the tri-layer structure 82. The connecting portions 90 of the inner plastic layer 62 may also form the first and second ends 58 and 60 of the tri-layer structure 82 when the tri-layer structure 78 is cut along the planes 86.

Figure 16:
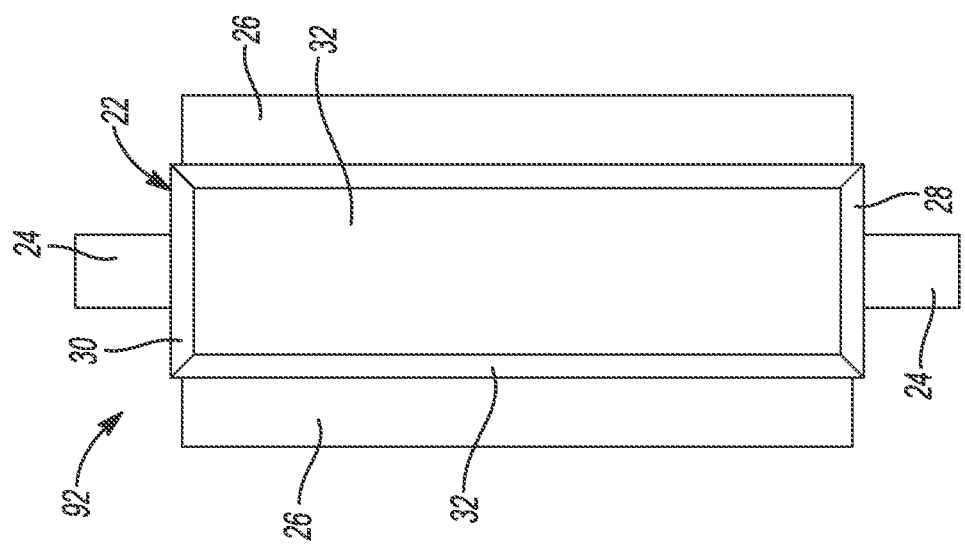
FIG. 16 is a planer view of an example of a battery cell according to the present disclosure including a pair of heat dissipation tabs that project from opposite sides of the battery cell.

Referring now to FIG. 16, a battery cell 92 is similar to the battery cell 12. However, the battery cell 12 includes only one pair of the heat dissipation tabs 26 that protrude from only one of the first side surfaces 32 of the main body 22. In contrast, the battery cell 92 includes one pair of the heat dissipation tabs 26 that protrude from one of the first side surfaces 32, and another pair of the heat dissipation tabs 26 that protrude from the other first side surface 32. The battery cell 92 may be formed by stacking two of the unfolded battery cells 12 shown in FIG. 3 such that their outer perimeters are aligned with one another, and then joining the battery cells 12 together along all four edges of the main bodies 22 thereof to seal the interior 47 of the battery cell 92.

The battery cells 12 may be used in a vertically-aligned cell pack such as the vertically-aligned pack of the battery cells 12 in the battery pack 10 of FIG. 2, which further includes only one cooling plate 16 disposed on only one side of the cell pack. In contrast, the battery cells 92 may be used in a horizontally-aligned cell pack that is part of a battery pack which further includes a pair of the cooling plates 16 disposed on opposite sides of the cell pack. For example, the battery cells 92 may be used in the horizontally-aligned pack of the battery cells 92 included in a battery pack 94 shown in FIG. 18 or the pair of horizontally-aligned packs of the battery cells 92 included in a battery pack 96 shown in FIG. 19.

Figure 17:
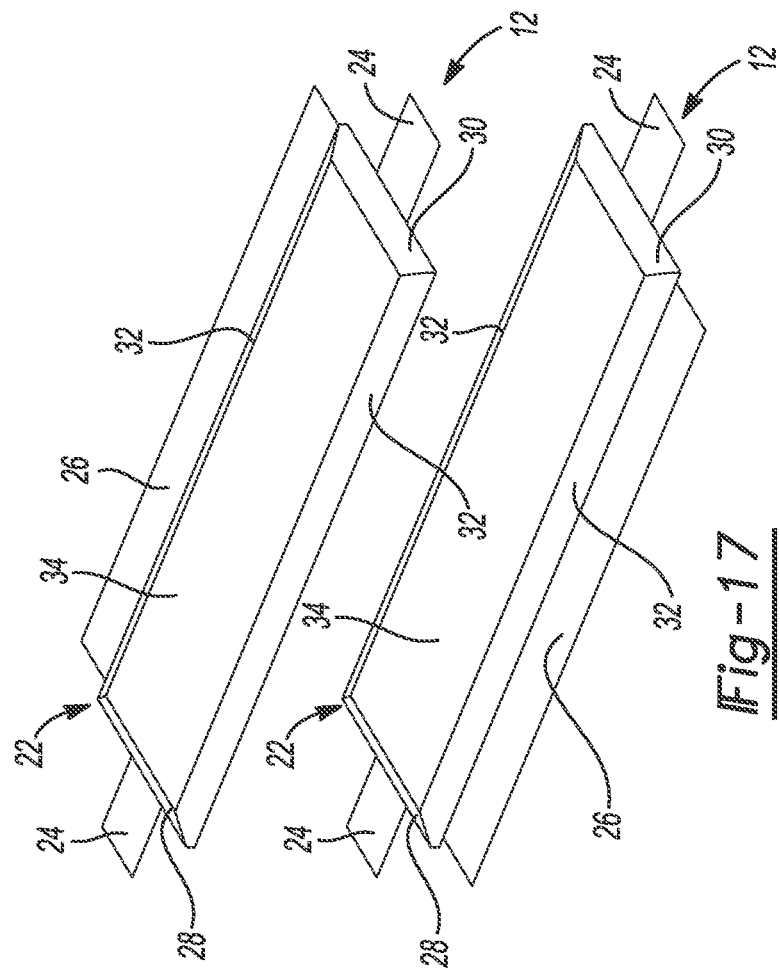
FIG. 17 is a perspective view of two of the battery cells of FIG. 1, where one of the battery cells has a heat dissipation tab projecting in one direction and the other battery cell has a heat dissipation tab projecting in the opposite direction.
Figure 18:
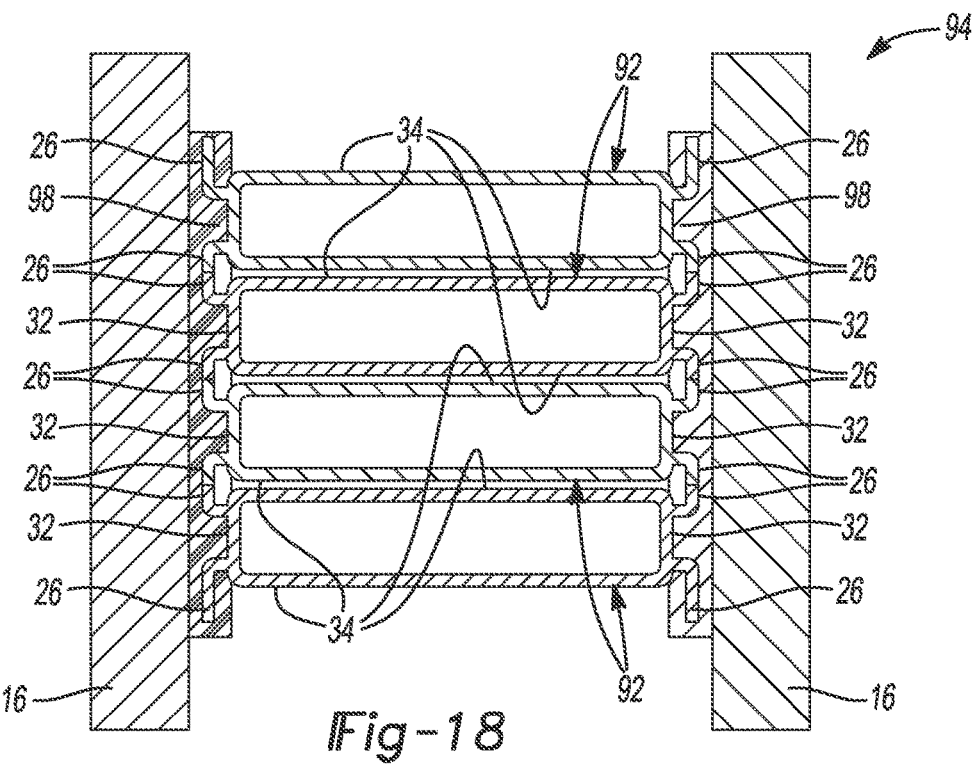
FIG. 18 a section view of another example of a battery pack according to the present disclosure.
Figure 19:
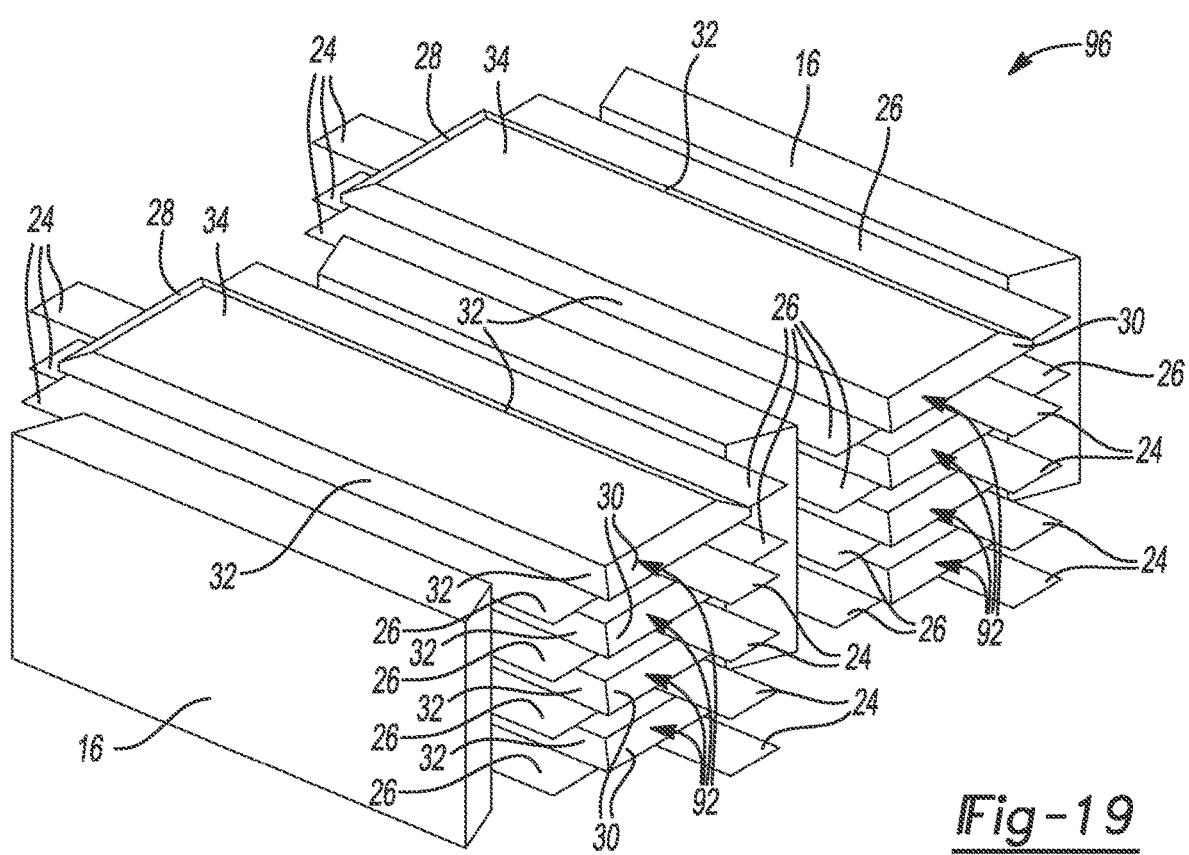
FIG. 19 is a perspective view of another example of a battery pack according to the present disclosure that is similar to the battery pack of FIG. 18.

In various implementations, the battery cells 12 may be included in the battery pack 94 or 96 of FIG. 18 or 19 in place of the battery cells 92. For example, one of the battery cells 12 may be oriented with its heat distribution tabs 26 projecting in one direction (e.g., toward one of the cooling plates 16 of the battery pack 94 or 96), and the battery cell 12 stacked thereon may be oriented with its heat distribution tabs 26 projecting in the opposite direction (e.g., toward the other cooling plate 16 of the battery pack 94 or 96) as shown in FIG. 17. The orientations of the heat distribution tabs 26 may continue to be alternated in this way to form the cell pack of the battery pack 92 or 94.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A battery cell comprising:
an inner plastic layer extending along at least three of sides of the battery cell;
an outer plastic layer extending along the at least three sides of the battery cell; and
a middle metal layer that forms at least one heat dissipation tab, the middle metal layer disposed between the inner and outer plastic layers, the middle metal layer extending along the at least three sides of the battery cell and projecting from at least a fourth side of the battery cell, the at least one heat dissipation tab configured to transfer heat to at least one cooling plate through thermal conduction, the fourth side of the battery cell connecting two of the at least three sides to one another,
wherein the inner and outer plastic layers are formed in discontinuous segments along a length of the middle metal layer such that portions of the middle metal layer are exposed,
the inner plastic layer, the outer plastic layer, and the middle metal layer forming a tri-layer structure, the tri-layer structure being folded so that the inner plastic layer forms an inner layer of the battery cell and ends of the tri-layer structure are adjacent to one another, and
wherein the at least one heat dissipation tab is bent in a direction perpendicular to side surfaces of the battery cell and parallel to the at least one cooling plate.

2. The battery cell of claim 1 wherein the inner plastic layer extends along the at least three sides of the battery cell and the fourth side of the battery cell.

3. The battery cell of claim 1 wherein the inner plastic layer extends along the at least three sides of the battery cell and does not extend along the fourth side of the battery cell.

4. The battery cell of claim 1 wherein the outer plastic layer extends along the at least three sides of the battery cell and at least partially along the fourth side of the battery cell.

5. The battery cell of claim 1 wherein the outer plastic layer also projects from the fourth side of the battery cell and encases a portion of the middle metal layer that forms the at least one heat dissipation tab.

6. The battery cell of claim 1 wherein the outer plastic layer extends along the at least three sides of the battery cell and does not extend along the fourth side of the battery cell.

7. The battery cell of claim 1 wherein:
the inner and outer plastic layers extend along the at least three sides of the battery cell and do not extend along the fourth side of the battery cell; and the middle metal layer extends along at least three sides of the battery cell and the fourth side of the battery cell.

8. The battery cell of claim 1 wherein the middle metal layer projects from the fourth side of the battery cell and one of the at least three sides of the battery cell to form a pair of heat dissipation tabs configured to transfer heat to a pair of cooling plates through thermal conduction.

9. The battery cell of claim 1 wherein:
the inner plastic layer is a polypropylene layer;
the outer plastic layer is a layer made of nylon, polyethylene terephthalate (PET), or a combination of nylon and PET; and
the middle metal layer is a layer made of aluminum, nickel, titanium, or stainless steel.

10. A method of making a battery cell comprising:
forming a metal layer;
forming a first plastic layer on one side of the metal layer;
forming a second plastic layer on the other side of the metal layer, the metal layer and the first and second plastic layers forming a tri-layer structure, wherein at least one of the first and second plastic layers is formed in discontinuous segments along a length of the metal layer such that portions of the metal layer are exposed and the metal layer forming at least one heat dissipation tab;
cutting the tri-layer structure such that the exposed portions of the metal layer form opposite ends of the tri-layer structure;

heating a portion of at least one of the first and second plastic layers to form a seal that seals an interior of the battery cell;

folding the tri-layer structure so that the first plastic layer forms an inner layer of the battery cell and the ends of the tri-layer structure are adjacent to one another; and bending the at least one heat dissipation tab in a direction perpendicular to side surfaces of the battery cell.

11. The method of claim 10 further comprising:
heating portions of the first plastic layer adjacent to the ends to form the seal.

12. The method of claim 11 wherein the second plastic layer is formed in the discontinuous segments along the length of the metal layer.

13. The method of claim 10 wherein both of the first and second plastic layers are formed in the discontinuous segments along the length of the metal layer.

14. The method of claim 10 wherein the exposed portions of the metal layer do not extend across an entire width of the metal layer.

15. The method of claim 10 wherein:
the first plastic layer is a polypropylene layer;
the second plastic layer is a layer made of nylon, polyethylene terephthalate (PET), or a combination of nylon and PET; and
the metal layer is a layer made of aluminum, nickel, titanium, or stainless steel.

16. A battery pack comprising:
a first set of battery cells;
a second set of battery cells; and
a thermal resistant barrier disposed between the first and second sets of battery cells, the thermal resistant barrier including a polyurethane layer having a first surface and a second surface opposite of the first surface, the first surface of the polyurethane layer directly facing the first set of battery cells, the second surface of the polyurethane layer directly facing the second set of battery cells,
wherein each battery cell of the first and second sets of battery cells includes:
an inner plastic layer extending along at least three sides of the battery cell;
an outer plastic layer extending along the at least three sides of the battery cell; and
a middle metal layer that forms at least one heat dissipation tab, the middle metal layer disposed between the inner and outer plastic layers, the middle metal layer extending along the at least three sides of the battery cell and projecting from at least a fourth side of the battery cell, the at least one heat dissipation tab configured to transfer heat to at least one cooling plate through thermal conduction, the fourth side of the battery cell connecting two of the at least three sides to one another,
wherein the inner and outer plastic layers are formed in discontinuous segments along a length of the middle metal layer such that portions of the middle metal layer are exposed,
the inner plastic layer, the outer plastic layer, and the middle metal layer forming a tri-layer structure,
the tri-layer structure being folded so that the inner plastic layer forms an inner layer of that battery cell and ends of the tri-layer structure are adjacent to one another, and
wherein the at least one heat dissipation tab is bent in a direction perpendicular to side surfaces of the battery cell and parallel to the at least one cooling plate.

17. The battery pack of claim 16 wherein the thermal resistant barrier is free of any aluminum layer.

18. The battery pack of claim 16 wherein the thermal resistant barrier is free of any gel layer.

19. The battery pack of claim 16 further comprising a cooling plate of the at least one cooling plate, wherein an end of each battery cell of the first and second sets of battery cells is in contact with the cooling plate, and the thermal resistant barrier is spaced apart from the cooling plate.

* * * * *